Figure 1:
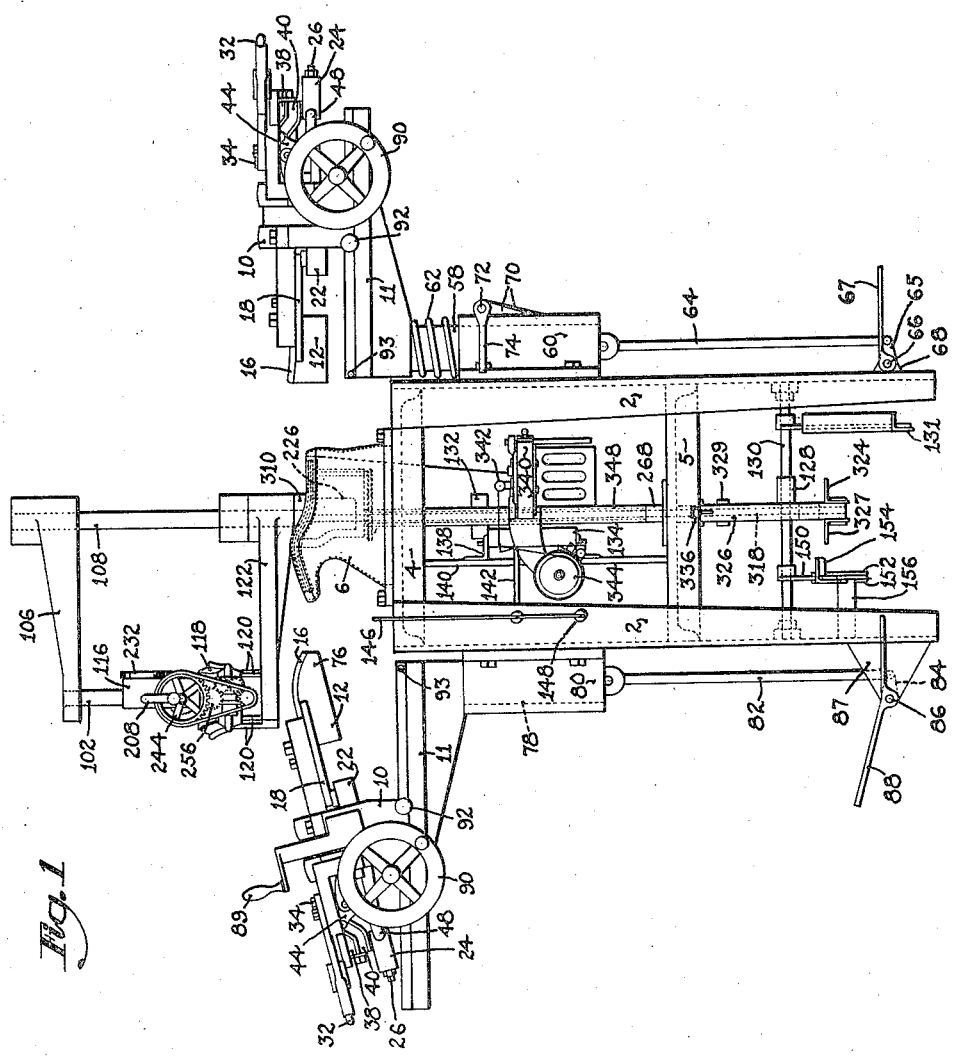

June 27, 1939.  A. LABRIE  2,163,688
MACHINE FOR MANUFACTURING SHOES
Filed Dec. 31, 1935   14 Sheets-Sheet 4

Witness
H. E. Van Dine.

Inventor
Anthony Labrie
by Fish Hildreth
Cary & Jenney Attys.

June 27, 1939.   A. LABRIE   2,163,688
MACHINE FOR MANUFACTURING SHOES
Filed Dec. 31, 1935   14 Sheets-Sheet 5
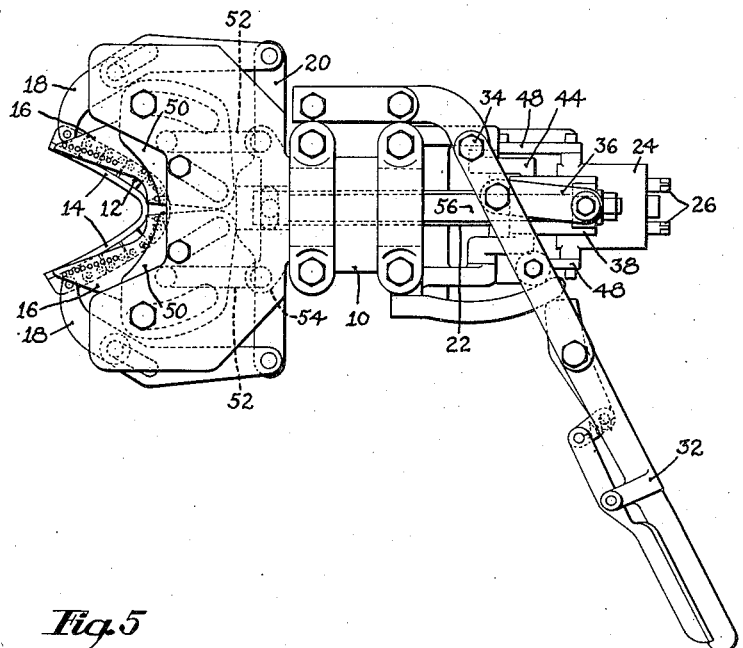
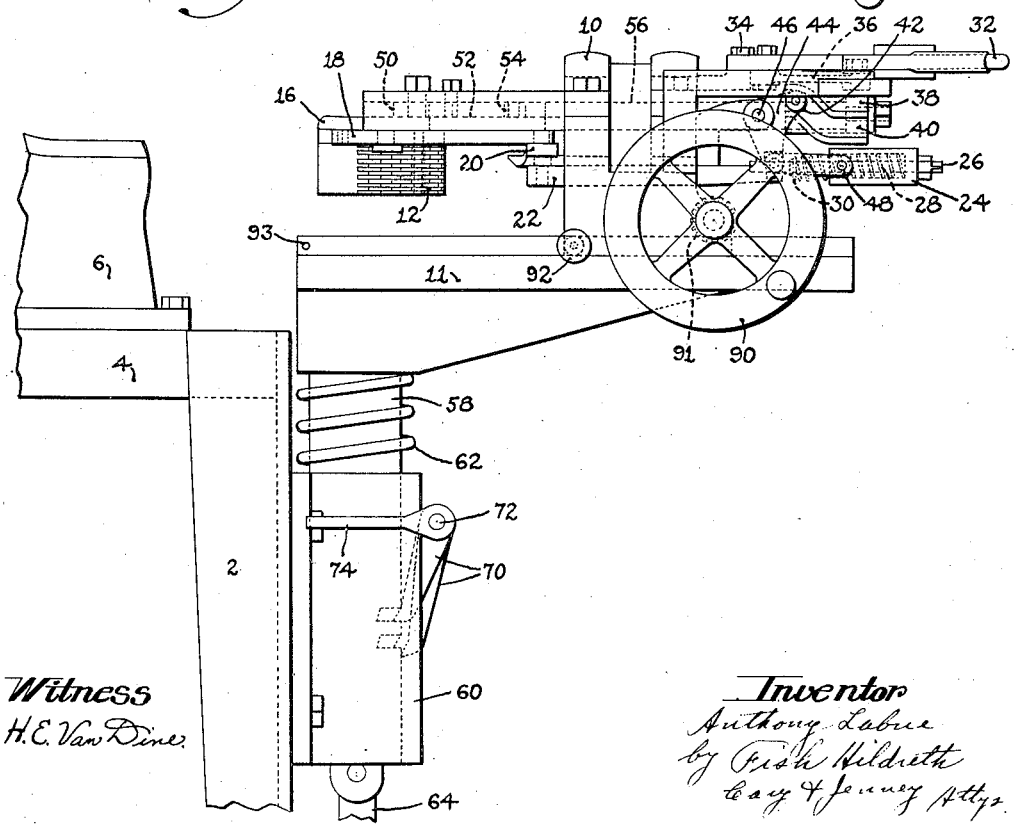

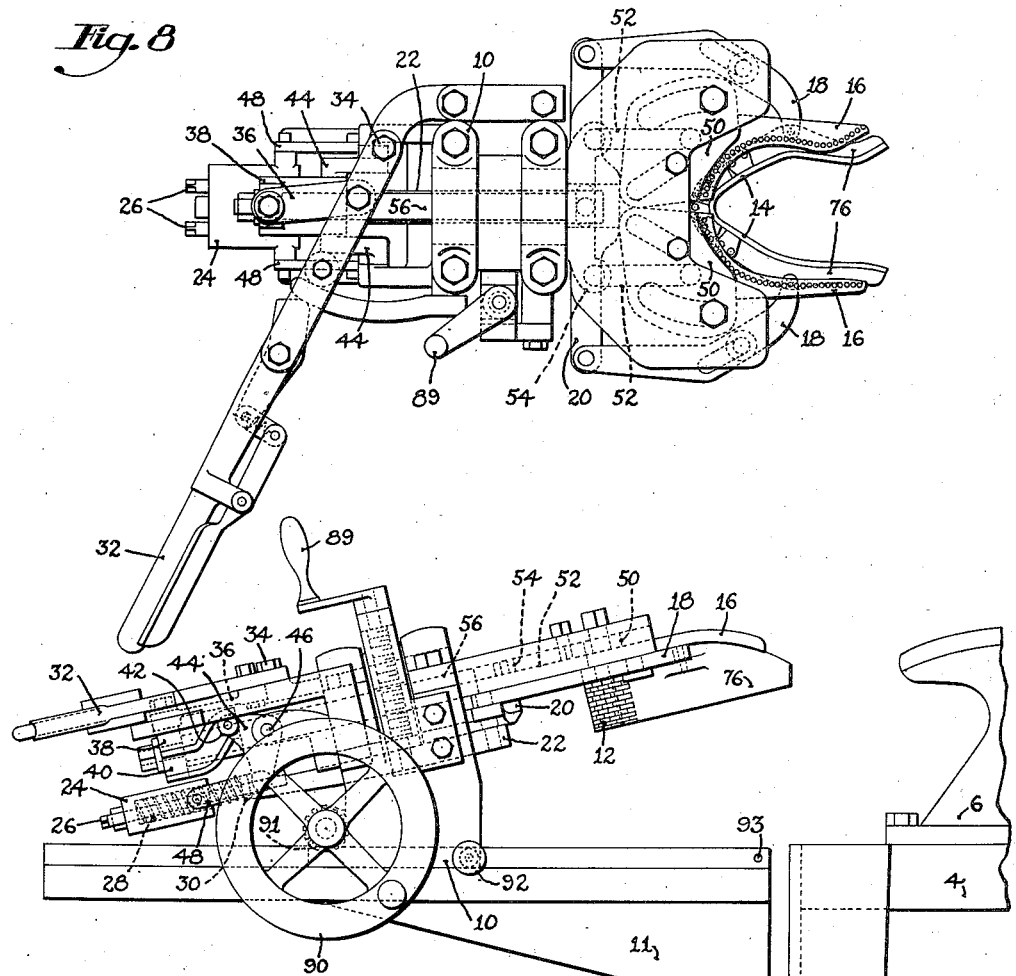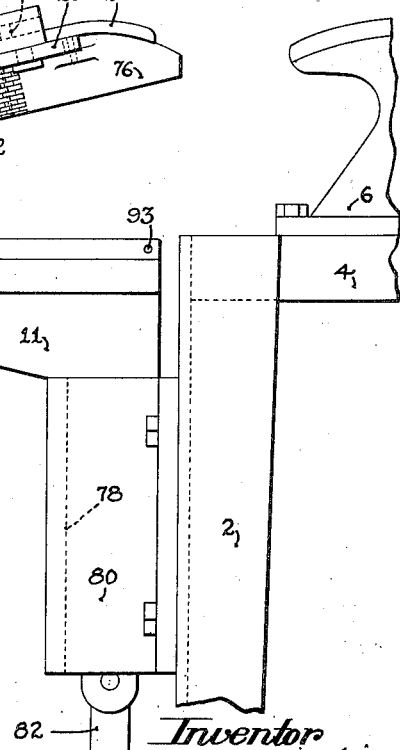

June 27, 1939. A. LABRIE 2,163,688
MACHINE FOR MANUFACTURING SHOES
Filed Dec. 31, 1935 14 Sheets-Sheet 7
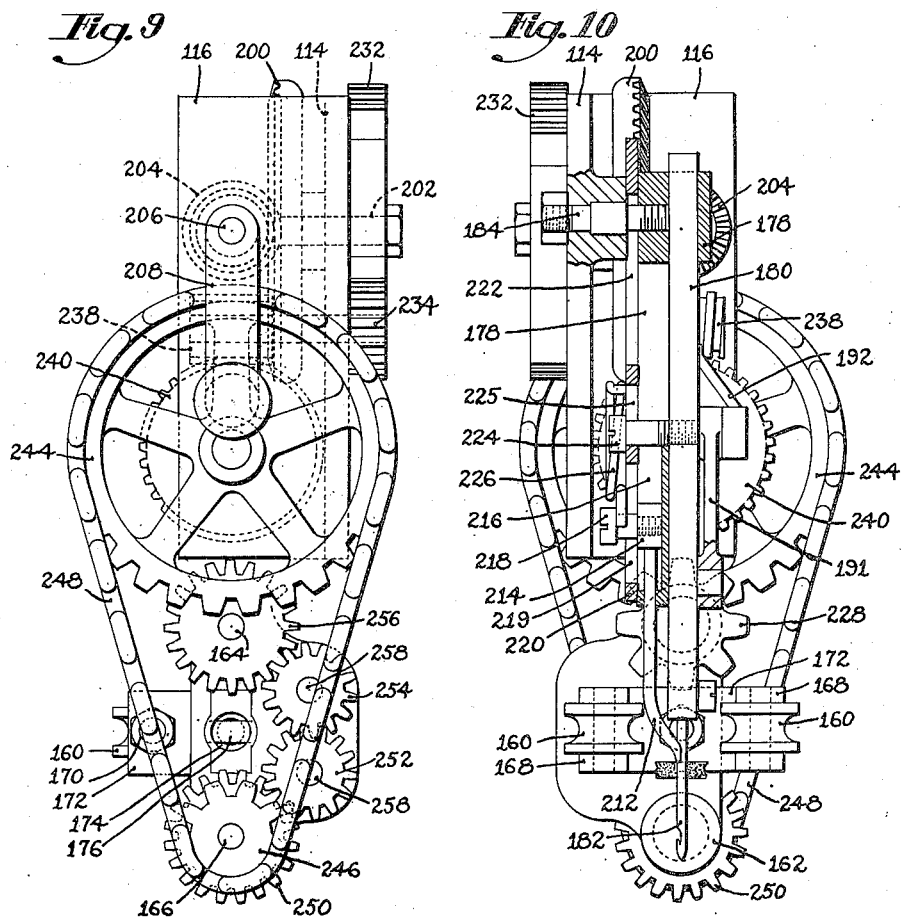

June 27, 1939.   A. LABRIE   2,163,688
MACHINE FOR MANUFACTURING SHOES
Filed Dec. 31, 1935   14 Sheets-Sheet 8

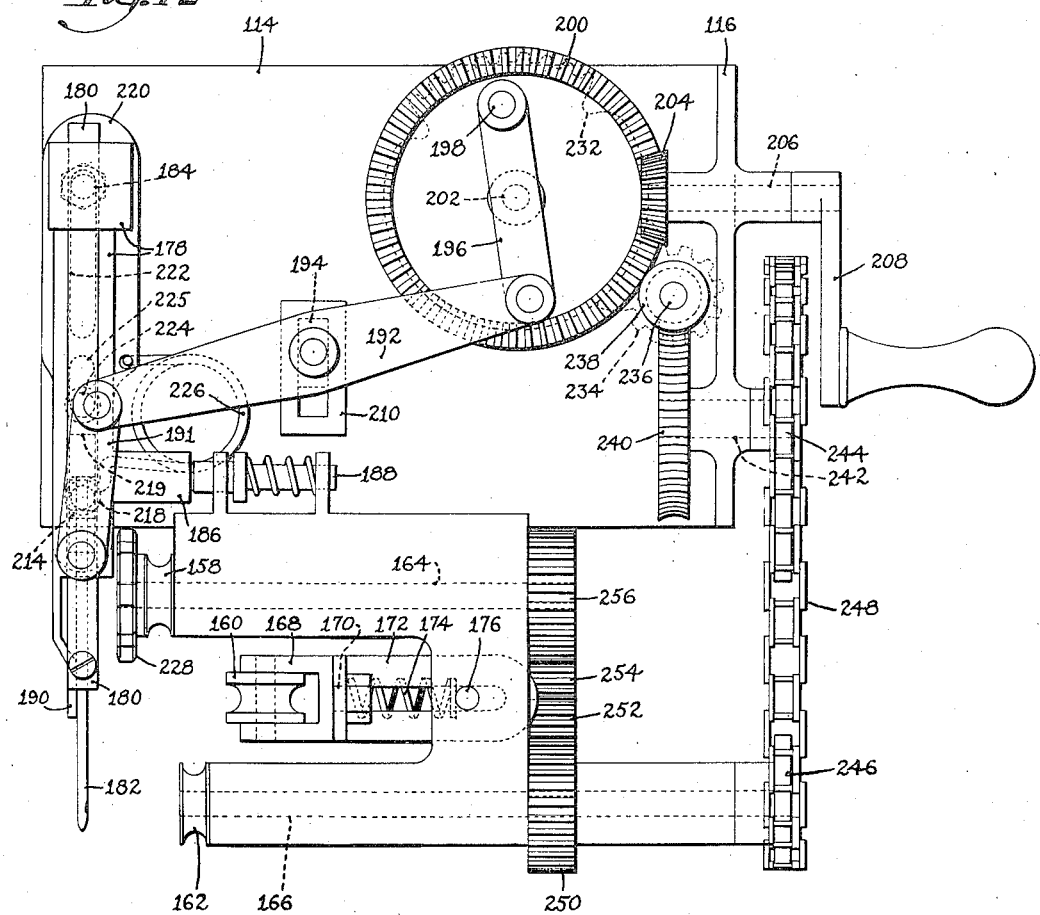

June 27, 1939.  A. LABRIE  2,163,688
MACHINE FOR MANUFACTURING SHOES
Filed Dec. 31, 1935   14 Sheets-Sheet 10
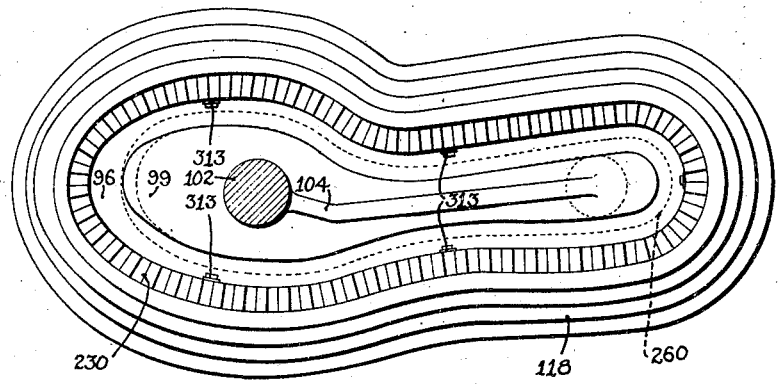
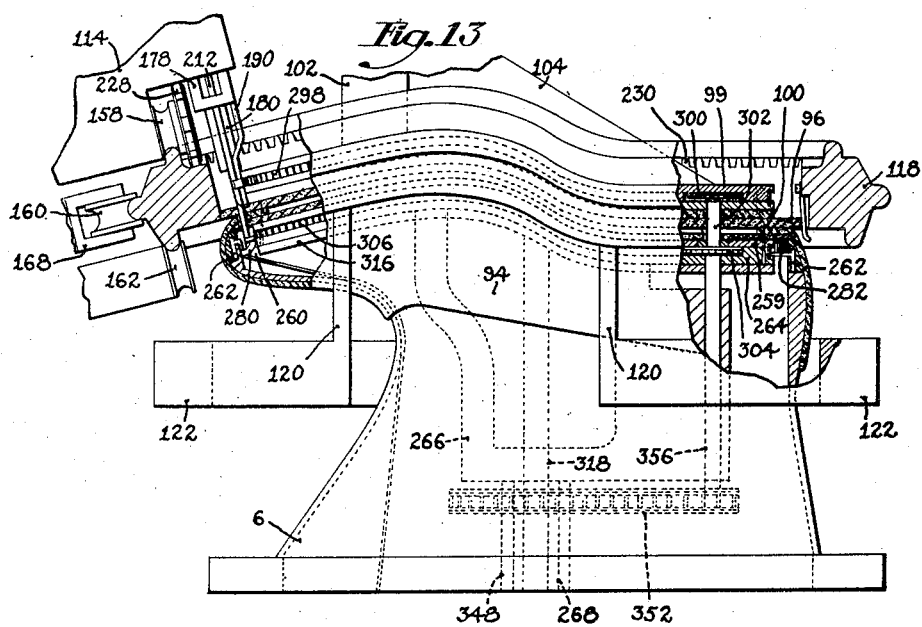
Witness
H. E. Van Dine.
Inventor.
Anthony Labrie
by Fish Heldreth
Cary & Jenney Attys June 27, 1939. A. LABRIE 2,163,688
MACHINE FOR MANUFACTURING SHOES
Filed Dec. 31, 1935 14 Sheets—Sheet 11
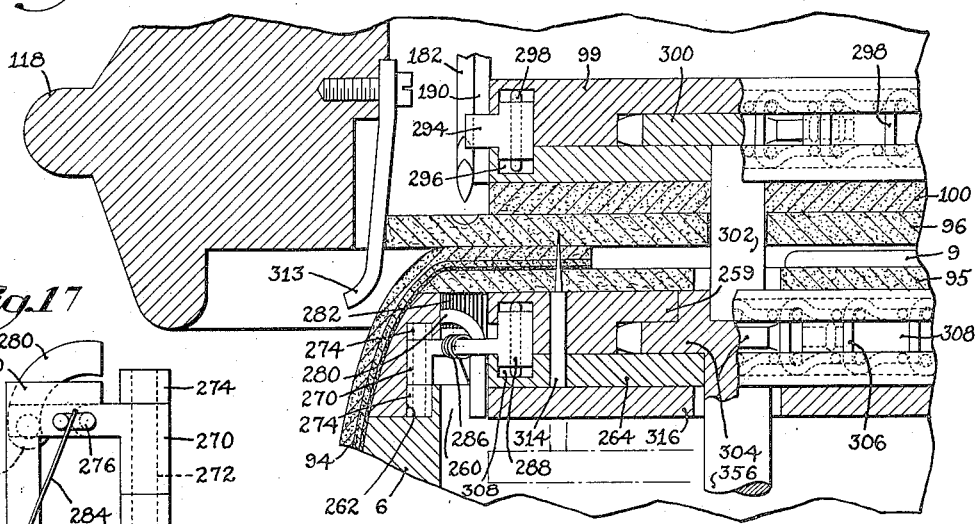
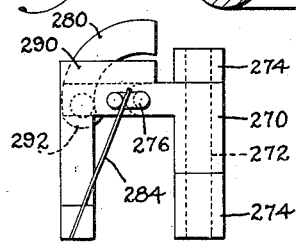
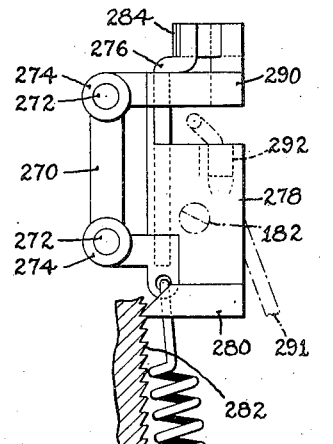
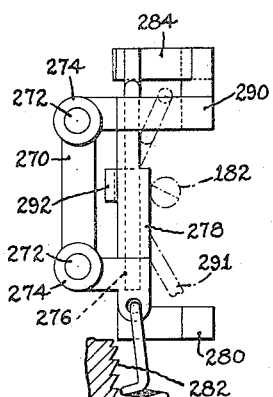
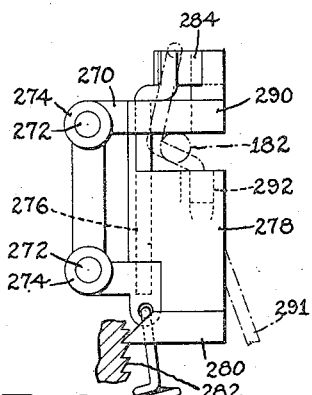
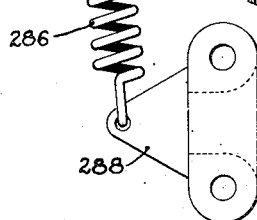
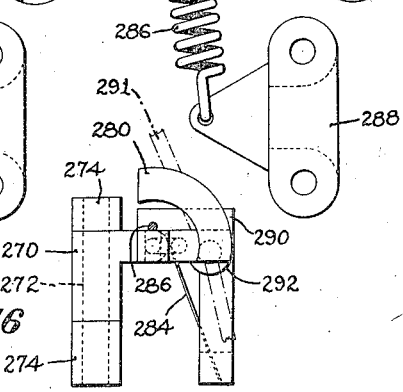
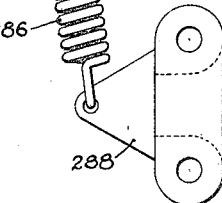

June 27, 1939. A. LABRIE 2,163,688
MACHINE FOR MANUFACTURING SHOES
Filed Dec. 31, 1935 14 Sheets-Sheet 12

Witness
H. E. Van Dine

Inventor
Anthony Labrie
by Fish Hildreth
Cary & Jenney Attys.

June 27, 1939.  A. LABRIE  2,163,688
MACHINE FOR MANUFACTURING SHOES
Filed Dec. 31, 1935  14 Sheets-Sheet 13

Witness
H. E. Van Dine.

Inventor.
Anthony Labrie
by Fish Hildreth
Cary & Jenney Attys

June 27, 1939.     A. LABRIE     2,163,688
MACHINE FOR MANUFACTURING SHOES
Filed Dec. 31, 1935     14 Sheets-Sheet 14
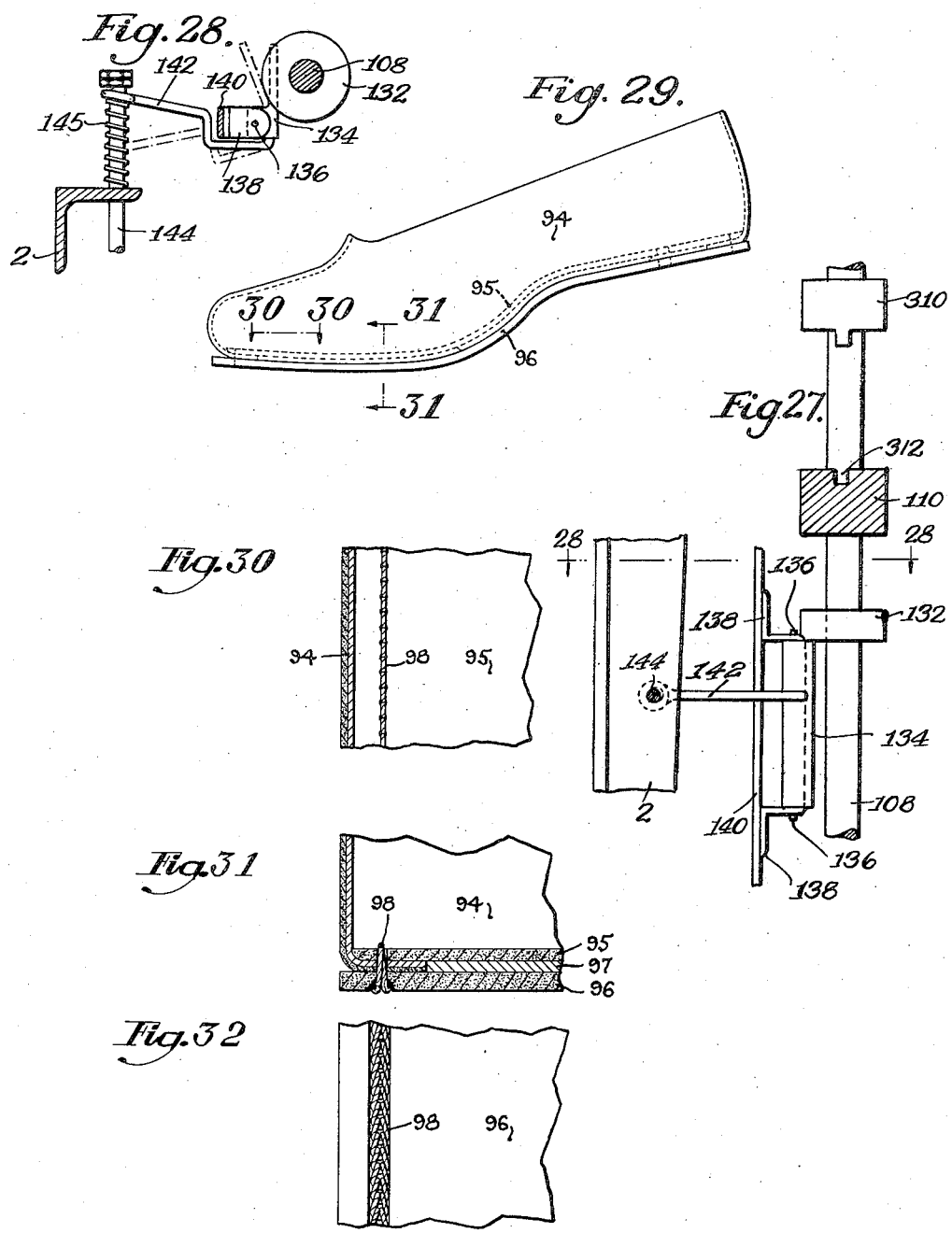
Witness
H. E. Van Dine.
Inventor
Anthony Labrie
by Fish Hildreth
Cary & Jenney Attys.

Patented June 27, 1939

2,163,688

UNITED STATES PATENT OFFICE 2,163,688

MACHINE FOR MANUFACTURING SHOES

Anthony Labrie, Haverhill, Mass., assignor to United Shoe Machinery Corporation, Paterson, N. J., a corporation of New Jersey Application December 31, 1935, Serial No. 56,966

23 Claims. (Cl. 112—34)

The present invention relates to a machine for assembling and sewing shoes of the McKay type, in which type of shoe the stitches of the seam holding the shoe together pass through the outsole, upper and insole of the shoe and appear on the outer surface of the outsole and at the inside of the shoe. In accordance with its general objects, the invention provides a new and improved machine well adapted for use in manufacturing in a simplified and improved manner, shoes of the McKay or of other similar type.

In the manufacture of a McKay shoe according to usual shoe making practice, the insole is secured to a suitable rigid wooden last by tacks. The upper is then applied to the last and molded into close fitting relation therewith so that the marginal edges of the upper overlap the edges of the insole. Additional tacks are driven through the overlapping portions of the insole and upper against a metal plate on the bottom of the last to clench the tacks in position, thus temporarily fastening the upper to the insole. The temporarily fastened upper and insole are then removed from the last. After removal from the last, the shoe is sewed on a so-called McKay stitcher having a rotary horn designed to extend within the shoe and to cooperate with a straight reciprocating hook needle in securing an outsole to the temporarily fastened upper and insole, the stitches passing through the edges of all the parts. Thereafter, the marginal edges of the outsole are trimmed, and the heel is attached.

This manner of manufacture has the objectionable feature that the removal of the last, while the insole and upper are held together by the temporary fasteners only, often strains or tears loose these fasteners so that difficulty is encountered in holding the shoe parts together properly for the sewing operation. Also for the best results this method necessitates the re-insertion of the last into the shoe after the sewing operation, so as to adequately support the shoe parts during the sole trimming, heel attaching and other finishing operations.

An object of the present invention is to provide a machine for manufacturing shoes which will enable the construction of a shoe free from the defects and difficulties above mentioned and, with this object in view, the machine of the present invention comprises a last upon which the upper, the insole, when the shoe is provided with an insole, and the outsole may be assembled, sewing mechanisms associated with the last by which the upper may be permanently secured to the shoe by a through-and-through seam, the stitches of which appear at the inside of the shoe and upon the outer surface of the outsole and means for holding the outsole on the last while so sewing.

Broadly considered, the invention contemplates the provision of any suitable forms of mechanisms adapted to cooperate with a last in forming the through-and-through seam. For convenience of operation, and for the attainment of uniform results, as well as to provide a simple and efficient machine, by which the through-and-through seam may be formed while the upper and outsole are supported on the last, the invention contemplates mounting the sewing mechanism and last in such a manner that the mechanism and last are relatively movable towards and from operative position and are also rotatably movable to transfer the point of operation of the sewing devices around the shoe.

To hold the outsole in position on the shoe during the sewing operation, a sole clamping form preferably is provided and this arrangement of a last, a sole clamping form to press the outsole against the bottom of the last, and a sewing mechanism to attach the outsole to the shoe while so held is considered to constitute a feature of the invention which is not limited to the use of a sewing mechanism adapted to sew any particular form of seam.

In order to permit the stitches of the seam to pass through the outsole and upper and appear on the inside of the shoe, the invention contemplates the provision of a hollow last, and certain features of the invention are embodied in a series of upper holding points mounted within the hollow last, together with means whereby these points may be projected through the insole and upper and operated to hold the upper and outsole in place after being worked into lasted position by the upper clamping and wiping devices.

In addition to the features of invention above referred to, the sewing mechanism of the machine hereinafter described also embodies many novel and valuable features. Thus, the sewing mechanism comprises a frame which is mounted to travel about the shoe during the sewing operation upon a support, which support, when in operative position with relation to the last, provides a guideway for the frame extending around the shoe. The frame is guided by tracks on the support, which tracks are arranged not only to cause the sewing devices carried by the frame to travel in a path corresponding generally to the outline of the outsole, but to tip and turn the frame so as to cause the needle of the sewing mechanism to enter the sole at the proper angle.

The tracks on the support above referred to guide the frame carrying the sewing devices in a path corresponding only approximately to the outline of the outsole. In order to determine the exact path of travel of the sewing devices, and thus the exact outline formed by the seam attaching the outsole to the shoe, the sole clamping form hereinbefore referred to is utilized as a guiding pattern or templet, and to this end the needle bar of the sewing mechanism is supported by a carrier which is mounted in the sewing frame for movement transversely to the direction of feed and is yieldingly pressed against the edge of the sole clamping form.

The sewing mechanism of the machine is constructed and arranged to form a chain stitch seam, and comprises a straight hook needle. In order to thread the needle while at the limit of its work piercing stroke with its hook inside of the shoe, a novel looper mechanism is provided supported by the last and arranged to be actuated by the needle during its reciprocation to lay the thread in the hook of the needle and to be actuated through suitable connections with the sewing frame to maintain its proper position with relation to the needle as the point of operation of the stitch forming devices is transferred around the shoe.

In addition to the features above referred to, the machine hereinafter described as embodying the several features of the invention comprises many other novel constructions and arrangements of parts hereinafter described and claimed, the advantages of which will be obvious to those skilled in the art from the following description, taken in connection with the accompanying drawings in which is illustrated the preferred form of machine of the present invention.

Figure 2:
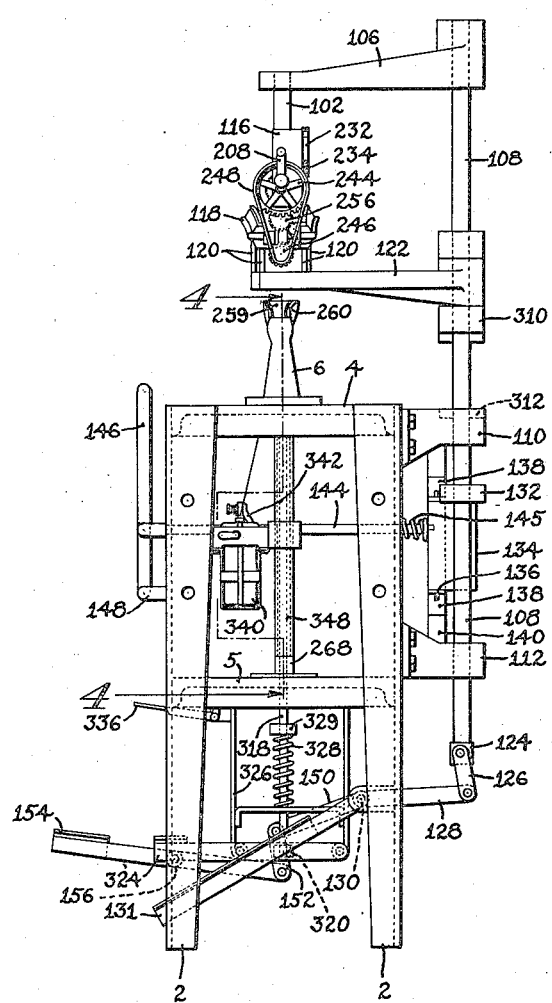
Figure 3:
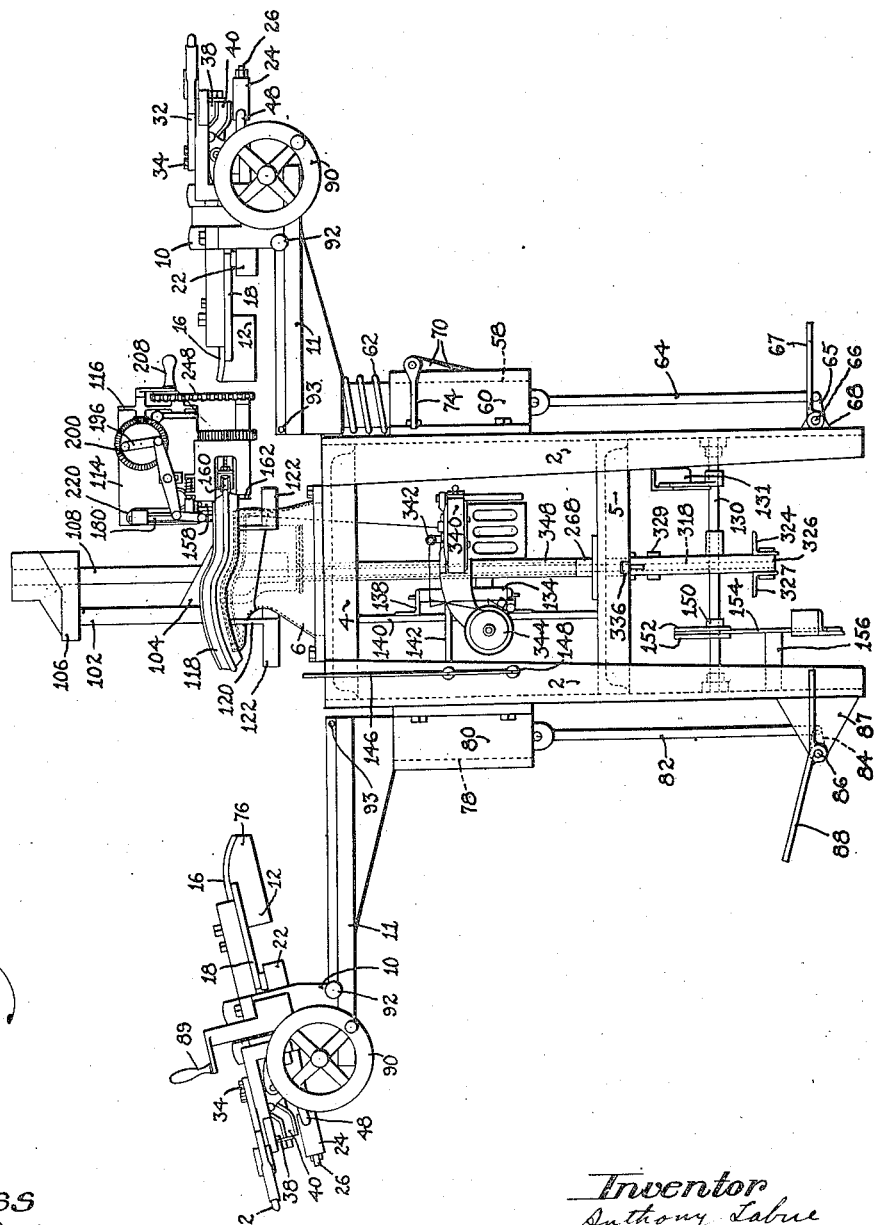
Figure 4:
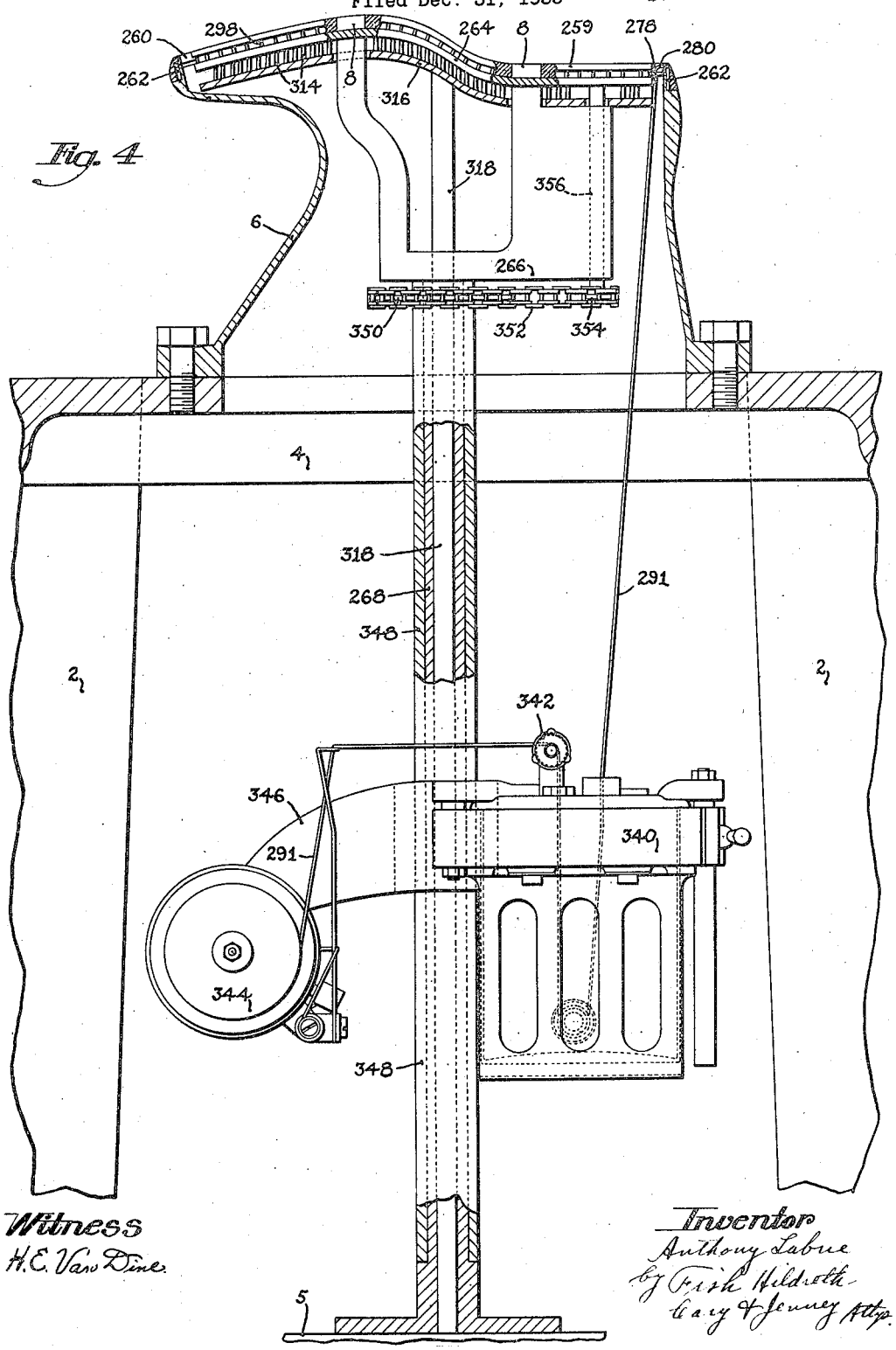
Figure 11:
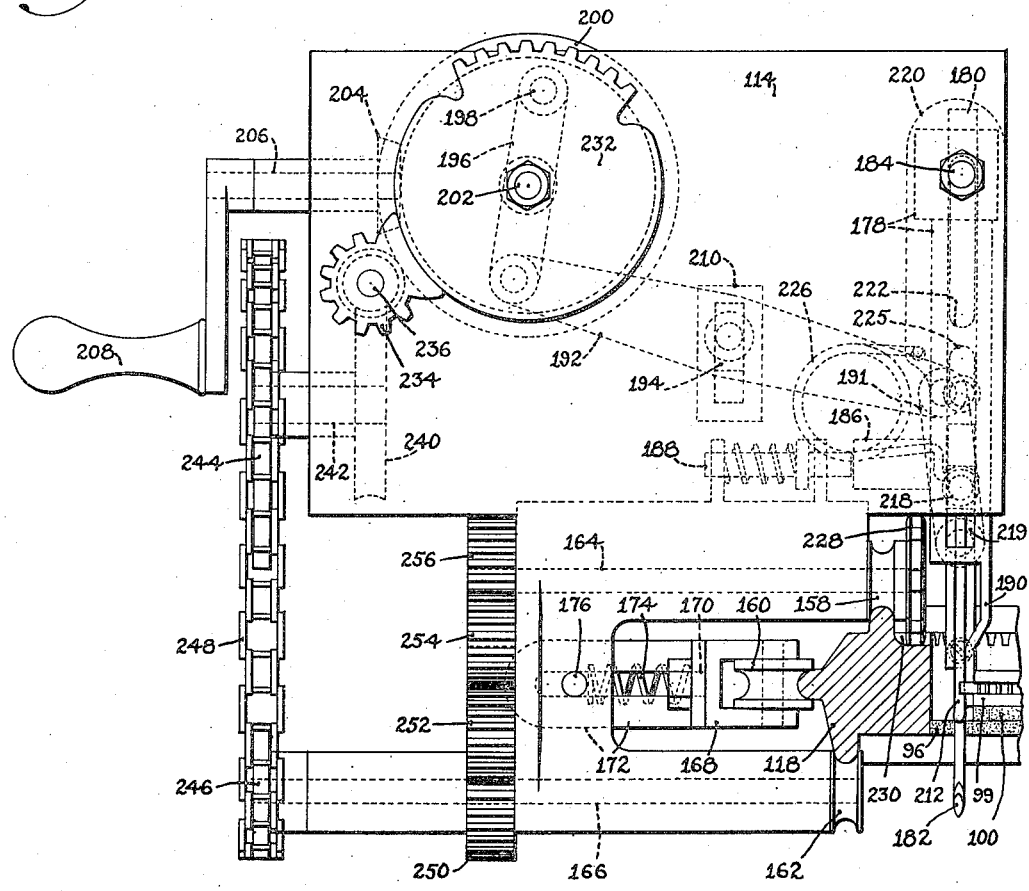
Figure 24:
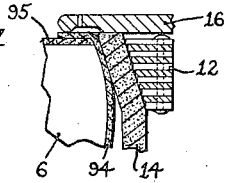
Figure 23:
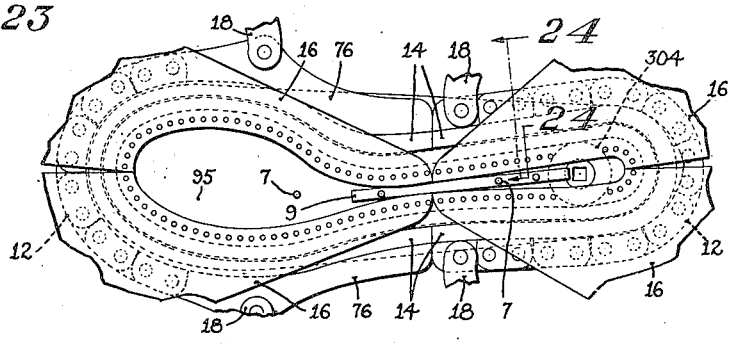
Figure 22:
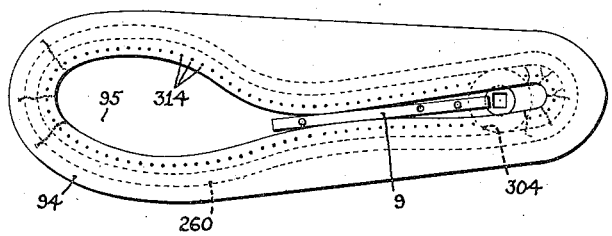
Figure 21:
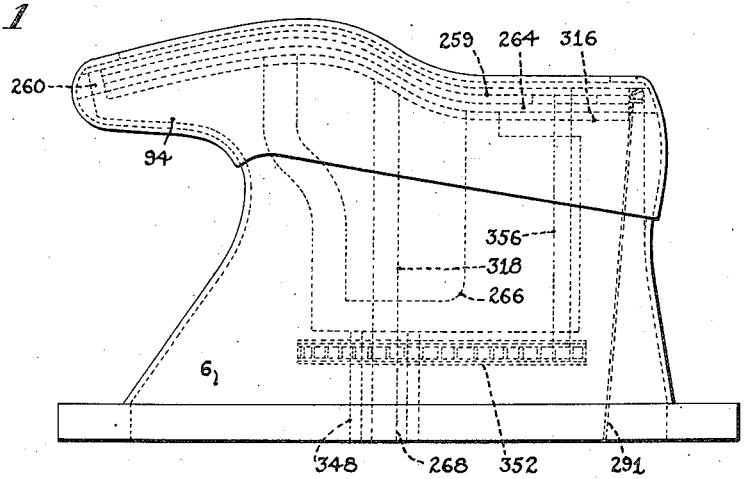
Figure 25:
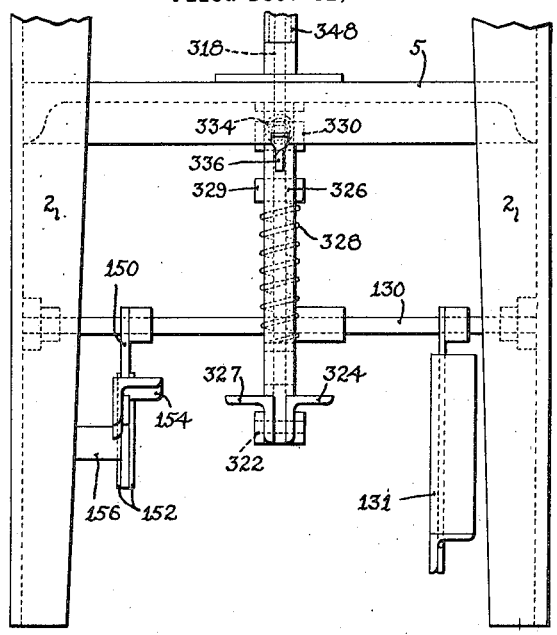
Figure 26:
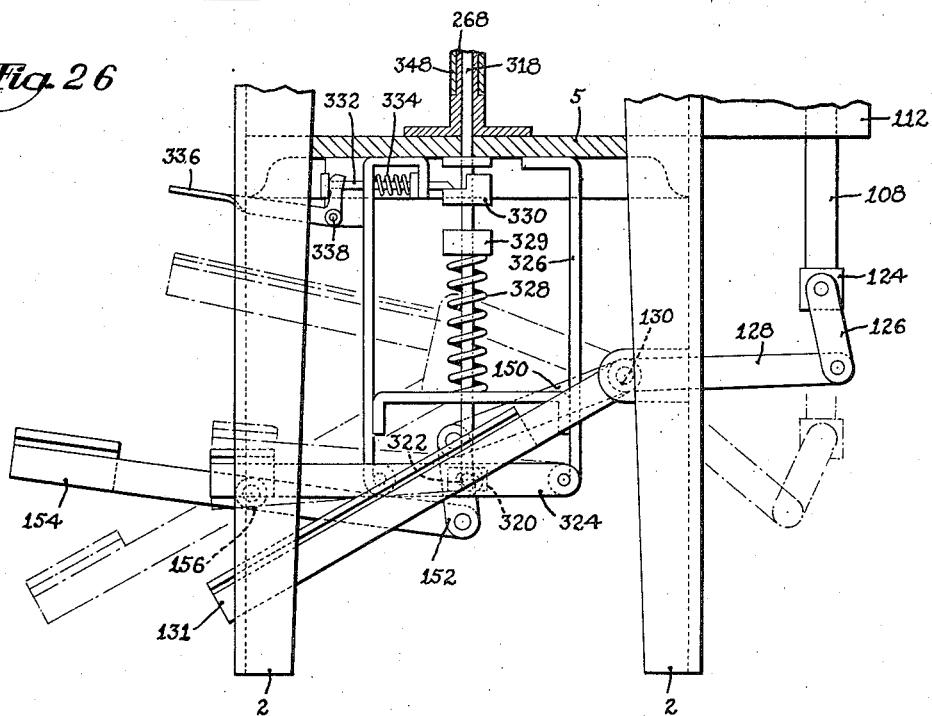

Referring to the drawings, Figure 1 is a view in front elevation of the complete machine; Figure 2 is a view in side elevation of the machine, looking from the right; certain parts of the lasting units having been omitted; Figure 3 is a view in front elevation of the machine showing an already lasted shoe being sewed to permanently secure the parts thereof together; Figure 4 is a sectional view on an enlarged scale taken along the line 4—4 of Figure 2; Figure 5 is a view in front elevation, on an enlarged scale, of the right portion of the machine illustrating the heel lasting unit; Figure 6 is a plan view of the heel lasting unit illustrated in Figure 5; Figure 7 is a view in front elevation of the left portion of the machine illustrating the toe lasting unit; Figure 8 is a plan view of the toe lasting unit; Figure 9 is a view in front elevation of a part of the sewing mechanism for the machine; Figure 10 is a view in rear end elevation of the same mechanism, certain parts of the supporting frame being broken away and shown in section; Figure 11 is a right side elevation of the sewing mechanism shown in Figures 9 and 10; Figure 12 is a view in left side elevation of the sewing mechanism; Figure 13 is a view in front elevation, partly broken away, and shown in section, of a portion of the machine illustrating the relative positions of the shoe and sewing mechanism during sewing operations; Figure 14 is a plan view of a support and form for guiding the sewing mechanism about the shoe; Figure 15 is a sectional view of portions of certain parts of the sewing mechanism and shoe being operated upon on an enlarged scale; Figure 16 is an end detail view, on a still further enlarged scale, of the needle looper in the position shown in Figure 15; Figure 17 is a similar view of the looper, looking at the opposite end; Figures 18, 19 and 20 are detail plan views of the looper indicating successive positions assumed during looping operations; Figure 21 is a detail view of the last used in the machine having a completely lasted shoe supported thereon; Figure 22 is a plan view of the shoe, indicating its relation to the last; Figure 23 is a plan view of the shoe with portions of the lasting units in positions assumed at the end of the lasting operations; Figure 24 is a sectional view of the parts indicated in Figure 23, taken along the line 24—24 of that figure; Figure 25 is a view in front elevation on a somewhat enlarged scale of the lower portion of the base of the machine illustrating the controlling treadles; Figure 26 is a view in side elevation, looking from the right of the same portion of the base, partly shown in section; Figure 27 is a detail view of devices for locking the sewing mechanism in raised position disengaged from the shoe; Figure 28 is a sectional view, taken along the line 28—28 of Figure 27; Figure 29 is a view in side elevation of a shoe, as constructed on the machine, embodying the present invention; Figure 30 is a sectional view, showing the inside of the shoe, as viewed along the line 30—30 of Fig. 29; Figure 31 is a sectional view of the shoe shown in Fig. 29, taken along the line 31—31; and Figure 32 is a view of a bottom portion of the shoe, looking at the tread surface of the outsole.

Referring to Figures 1, 2, and 3 of the drawings, the illustrated machine comprises a base constructed of four upright angle section legs 2 connected at their upper ends to a horizontal flanged metal top 4 and intermediate their ends by a partition 5 similar in shape to the top. To support the parts of the shoe to be operated upon, a hollow metal last 6 is removably mounted upon the top 4 of the base. In the manufacture of a shoe, an insole is first applied to the bottom of the last and tacks 7, shown in Fig. 23, are driven therethrough into wooden plugs 8 (Fig. 4) inserted into the last bottom to receive them. If a metal shank stiffener, as indicated at 9, is to be used, it is perforated to receive one of the tacks 7 which secures the insole to the last. The upper is then placed over the last in position to be acted upon by the lasting devices.

At the toe and heel ends of the last are lasting units mounted on the machine to work an upper over the last and cause it to conform properly with the curved surfaces of the last, the margin of the upper overlapping the edges of the insole. The lasting units are supported on the machine base by sliding carriages 10 mounted on horizontal guideways 11 along which they are movable towards and from the last. The operating devices of each lasting unit, as shown in Figs. 5 to 8 inclusive, are similar to those illustrated and described in U. S. Patents No. 1,495,169 of May 27, 1924, and No. 1,284,870 of November 12, 1918 in which there is an upper embracing and clamping band comprising a supporting chain 12 backed by a soft flexible facing 14 and a pair of oppositely moving wiper plates 16. Each upper clamping band is advanced and closed about one end of the shoe by means of a pair of slides 18 which are movable lengthwise of the shoe and are connected to opposite ends of the chain and to a cross bar 20 which is, in turn, connected midway between its ends to a slide 22 in the carriage 10. At the outer end of the slide 22 is a cross head 24 and extending from the slide is a pair of rods 26 passing loosely through openings in the cross head and having their outer ends squared to permit rotation of their inner threaded ends in correspondingly threaded openings in the slide. Encircling the rods are springs 28 compressed between the cross head and collars 30 secured to the rods, the springs 28 acting to impart a yielding pressure to the clamping bands through the slide 22 when the cross head 24 is actuated by manipulating a hand lever 32 extending towards the front of the machine.

Each hand lever 32 is pivotally mounted at its rearward end upon a stud bolt 34 secured in the carriage 10 which supports each lasting unit. Connected to the hand lever by means of a link 36 is a cam block 38 provided on its opposite sides with cam slots 40 of more or less S form in which are guided rolls 42 carried at the upper ends of bell crank levers 44 fulcrumed on horizontal pivots 46 at either side of the lasting unit carriage 10. The lower ends of levers 44 are connected by means of links 48 to the cross head 24 so that when the hand lever 32 is moved about its pivot, and the cam block moved correspondingly, the upper clamping band will be moved through a limited distance against the ends and sides of the last. The lower portions of the cam slots are parallel to the direction of movement of the cam block 38 so that, during the latter part of the handle lever movement, no motion is imparted to the clamping band.

After the band has been forced against the shoe, the wiper plates 16 are moved inwardly towards each other to gather the margin of the upper over the bottom of the last and to iron down the pleats thus formed in the upper margin. The wiper plates are secured to plate carriers 50 sliding in the carriage 10 for each lasting unit and the carriers are connected by links 52 to an equalizing lever 54 pivotally connected between its ends with a slide rod 56, the slide rod 56 being connected to the cam block 38 which operates the upper clamping band.

The heel lasting unit (Figs. 5 and 6) while disengaged from the shoe, is ordinarily held in a raised position with the wiper plates somewhat above the upper surface of the last. The guideway 11 on which the carriage 10 of the heel unit is movable towards and from the last is fixed to the upper end of a bar 58 sliding loosely in a guiding frame 60 bolted to the legs at one side of the base of the machine. The carriage 10 is supported in raised position by a spring 62 coiled about the bar 58 between the lower surface of the slide and the upper surface of the frame 60 to maintain the unit in its raised position. To lower the lasting unit to the proper operating position, the lower end of the bar 58 is connected through a vertical link 64 to an arm 65 (Fig. 1) on a rock shaft 66 carrying a foot operated treadle 67 rotatable in bearings 68 on two of the legs forming the machine base. To maintain the heel lasting unit in lowered position, the portion of the bar 58 surrounded by the frame 60 is notched and engaged by one or the other of a pair of yielding independently movable pawls 70 loosely supported on a shaft 72 rotatable in a bearing in the frame 60. To release the pawls from the lasting unit support bar, a handle 74 is fixed to the shaft 72 which carries suitably arranged pins (not shown) to engage the pawls 70 and move them away from the support bar 58 when the shaft is rocked.

The toe lasting unit, as shown in Figs. 7 and 8, is of substantially the same construction as the heel lasting unit except for certain differences, such as the shape of the wiper plates to conform with the peripheral and lengthwise curvatures of the shoe toe and the provision of rigid form fitting fingers 76 pivotally mounted between their ends on the slides 18, providing a connection between the slides and the chain. The free ends of the fingers 76 act to press the upper within the concavely curved portions of the last and extend a sufficient distance rearwardly of the toe of the shoe to balance the forces exerted at their forward ends. The toe wiper plates are longer than those in the heel lasting unit and meet the heel lasting wiper plates (see Fig. 23). The toe lasting unit is also tilted upwardly somewhat from the horizontal to fit the inclination of the shoe toe tip.

When the clamping band and wiper plates of the toe lasting unit are moved against the shoe upper, they are given an up-wiping movement by moving the unit as a whole vertically. The toe lasting unit guideway 11 is secured to the upper end of a cylindrical bar 78 sliding in a guiding frame 80 bolted to the machine base and the lower end of the bar is connected by means of a link 82 to an arm 84 (see Fig. 1), fixed to a treadle operated shaft 86. The shaft 86 rotates in bearing plates 87 on the legs 2 and carries a double ended treadle lever 88 by means of which the operator's foot may rock the shaft in either direction to raise or lower the toe lasting unit. The toe lasting bands and wipers are also rotatable about a substantially horizontal axis when necessary to conform with the shape of the last by regulating a handle 89. To move the carriage 10 of the lasting units towards and from the last and hold them in place on the slides during lasting operations, a hand wheel 90 is provided on each carriage for rotating a spur gear 91 engaging a rack in the guideway and a spring pressed locking plunger 92 is slidably mounted in each carriage to engage an opening 39 in the guideway when the carriage is moved to operative position. This mechanism is substantially the same as that illustrated and described in U. S. Patent No. 1,018,477 granted February 27, 1912.

In the embodiment of the present invention, after the last units have been operated, the locking plungers being withdrawn, the units are moved away from the shoe on the last, and a sewing mechanism, also mounted on the machine, is swung into operative relation with the last to secure the shoe parts together with a permanent seam passing through the parts and appearing at the tread surface and within the shoe. While the lasting units are being moved away and the sewing mechanism is being swung into operative relation with the shoe, the parts are held temporarily in position by a series of sticker points, to be described more fully hereinafter.

As more clearly illustrated in Figures 29 to 32, the shoe consists of an upper 94, an insole 95, and an outsole 96 although it is within the scope of the invention to construct a shoe in the same general manner, but omitting the insole 95. The upper 94 is formed over the last 6 in the manner described. After the lasting operations are completed, and the tacks 7 (Fig. 23) removed, the space between the inturned edges of the upper may be filled by a suitable plastic or other material 97. The outsole 96 is then positioned in proper relation to be attached, and the sewing mechanism is operated to form a chainstitch seam 98, the chain of which appears in a preformed groove at the outer surface of the outsole.

To clamp the outsole to the shoe during the sewing operation a form or clamping plate 99 (see Figs. 13, 14 and 15) is provided, shaped to correspond with the bottom curvature of the shoe and having a soft sponge rubber pad 100 on its lower side to prevent injury to the finished surface of the outsole. The form 99 is mounted on a vertical rod 102 having a triangular shaped reenforcing brace 104 extending lengthwise of the form. The upper end of the rod 102 is fixed to the forward end of a horizontal extending arm 106 (Figs. 1, 2 and 3) secured at its rearward end to a vertical shaft 108 mounted loosely in bearings 110 and 112 connected with the rear legs of the machine base.

The sewing mechanism is carried in a frame consisting of a vertical plate 114 shown in Figs. 9 to 13 inclusive, having a right angle flange portion 116 at its forward end. The frame is mounted on a continuous curved track support 118 mounted on vertical pins 120 (see Figs. 1, 2 and 3) extending upwardly from an open ended arm 122, also secured to the vertical shaft 108 which supports the form 99. The end of arm 122 is shaped to surround the last when the arm is lowered over it, so that the curved track and the edges of the form 99 will be spaced to provide a slot through which the sewing mechanism may operate on the shoe.

To permit the sewing mechanism and the form to be moved together towards and from the last, means are provided for raising the shaft 108 so that the arm 122 and support 118 will clear the last. The lower end of the shaft is rotatably connected to a block 124 (see Figs. 25 and 26) which is pivotally connected to the upper ends of a pair of links 126. The lower ends of links 126 are connected to an arm 128 secured to a horizontal rock shaft 130 rotatable in suitable bearings on the rearward legs 2. At the right end of rock shaft 130 is fixed a forwardly extending treadle 131 which, when depressed, acts to raise the sewing mechanism and form through the connections thus described.

To hold the sewing mechanism and form in raised position, the shaft 108 carries a collar 132 (see Figs. 27 and 28) engaged by a vertically elongated latch plate 134 pivoted on horizontal pins 136 in angle brackets 138 carried on a flat vertical bar 140, connecting the bearings 110 and 112, as shown in Fig. 2. The latch plate is operated yieldingly against collar 132 by a bent arm 142 connected to the plate and formed with an eye surrounding a bolt 144 slidable in openings in the legs 2 at the left of the base. Between the arm 142 and the left rearward leg 2 is a coil spring 145 surrounding the bolt 144. At the forward end of the bolt 144, there is pivotally connected a hand lever 146, the lower end of which is fulcrumed on a lug 148 extending from the left forward leg 2. When the hand lever 146 is pulled forwardly, the latch plate 134 is withdrawn from beneath the collar 132, so that the sewing mechanism and form 99 may move downwardly against the shoe by gravity. To force the form to a still lower position against the outsole of a shoe so that the outsole may be forced into closer fitting relation with the lasted upper and insole, the rock shaft 130 carries at its left end an arm 150 connected by means of a pair of links 152 to the rearward end of a treadle lever 154 pivotally mounted intermediate its ends on a boss 156 (see Fig. 25) extending towards the right from the left forward leg 2. Downward pressure on the forward end of treadle lever 154 is thus transmitted through the rock shaft 130 and to the form.

The support 118, as best shown in Figs. 11, 13, 14 and 15 has three rounded rail or track portions, one at the top, one at the side, and one beneath the support, along which correspondingly shaped truck wheels 158, 160 and 162 on the sewing mechanism ride. The wheels 158 and 162 are fixed at the inner ends of parallel shafts 164 and 166 respectively mounted to rotate in bearings in an enlarged cut-away lower portion of the sewing frame. There are two trucks 160 (see Fig. 10) spaced horizontally and mounted in individual U-shaped carriers 168 having horizontally extending individual stud members 170 passing loosely through the cross portion of a T-shaped bracket 172 to permit the carriers with the rolls 160 to rotate independently about the axes of the studs. The bracket 172 is slidably mounted in the sewing frame to permit movement of wheels 160 towards and from the support 118. To force the wheels 160 yieldingly against the track, the bracket 172 is slotted along its forwardly projecting portion and bored to receive a spring 174 compressed between the central part of the bracket and a pin 176 passing through the machine frame and the slot in the bracket. This provision for yielding and for separate rotary movement of carriers 168 permits the sewing frame supporting wheels to change their relative positions along the curved portions of the support 118 and assist in positioning the sewing frame always at the proper angle.

In the rearward end of the sewing frame is pivotally supported a vertical carrier 178 for a reciprocating needle bar 180 to the lower end of which is fixed a straight hook needle 182. The needle bar carrier is so located that the needle will pass through the space between the form 99 and the track 118 and is pivoted to swing at its upper end about a stud 184 mounted in the sewing frame, so that the needle may be moved transversely of the support 118. The needle bar carrier is formed at its upper end with a suitable guiding passage for the needle bar and at its lower end is formed with a vertical groove in which the needle bar slides. Also at the lower end of the carrier is a forwardly extending boss 186 (Fig. 12) engaged by a spring pressed plunger 188 slidingly mounted in a pair of ears formed on the sewing frame. The plunger 188 tends to force the needle bar carrier 178 rearwardly. The movement of the carrier is resisted by a downwardly extending finger 190 on the carrier which is bent forwardly to engage the form 99 in advance of the point where the needle penetrates the work. During the movement of the sewing frame about the shoe, it is caused, by the guiding tracks on the support 118, to travel in a path corresponding only approximately to the outline of the outsole. During this travelling movement of the sewing frame, the needle bar carrier is moved forwardly and rearwardly transversely to the line of feed by the engagement of the finger 190 with the edge of the sole clamping form 99. This form has an outline corresponding to the outline of the outsole and thus acts as a guide or templet to determine the exact path of travel of the needle and consequently the exact outline formed by the seam which attaches the outsole to the shoe.

To reciprocate the needle bar 180, the bar is connected by means of a link 191 to one end of an operating lever 192 having a pivot on a block 194 and at its other end a pivotal connection with a link 196. The link 196 is supported by a crank pivot 198 on a bevel gear wheel 200 secured to a shaft 202 rotating in bearings in the sewing frame. The bevel gear wheel 200 is rotated by a corresponding gear 204 secured to the inner end of a shaft 206 passing through the flange portion 116 of the frame. The outer end of shaft 206 carries a crank 208. As the bevel gear wheel 200 is rotated during sewing, the lever 192 is oscillated about its pivotal mounting on the block 194 and the block, which is loosely guided in an opening in a raised lug 210 on the sewing frame permits the pivotal mounting of the lever 192 to move slightly in either direction and provides a slight dwell in the reciprocating movements of the needle at both ends of the stroke.

A cast-off is also provided, as indicated at 212, secured to a block 214 (see Fig. 10) to cooperate with the needle. The block 214 slides in a rectangular slot 216 in the needle carrier 178, the cast-off passing through an opening in the frame. Threaded into the block 214 is a shouldered screw 218 projecting through a slot 219 in the lower end of a cast-off operating slide 220. In the upper end of the slide 220 is a second slot 222 through which the carrier pivot stud 184 extends and intermediate the ends of the slide a screw 224 passes through a third slot 225 in the slide and is threaded into the needle bar 180. The screw 218 in the cast-off block 214 is yieldingly forced to a lowered position by a looped wire spring 226 having its slide 220 (see Fig. 12). The arrangement is such that when the needle bar descends, the screw 224 moves the slide downwardly, thus causing the cast-off block 214 to be moved yieldingly by the spring 226 until the cast-off 212 strikes the upper surface of the work.

Thereafter the cast-off is held stationary at the surface of the work and the spring 226 yields as the needle bar 180 and slide 220 continue their downward movement. During the rising stroke of the needle bar, the cast-off remains in its lowermost position until the screw 224 engages the upper end of slot 225, the slot being sufficiently long to permit the barb of the needle to be covered by the cast-off. Further upward movement of the needle bar causes the slide 220 and cast-off 212 to rise. As the needle bar again begins to descend, the screw 224 moves idly to the bottom of slot 225, permitting the barb to be uncovered and the needle to pass through the loop in the usual way.

In order to advance the sewing mechanism along the support 118 with a feeding movement between the reciprocations of the needle, the shaft 202 on which the bevel gear wheel 200 is mounted is connected to rotate the truck wheels 158 and 162, and the wheel 158 carries a spur gear 228 which engages rack teeth 230 (see Figs. 11, 13 and 14) formed at the inner edge of the support 118. The shaft 202 carries at the end opposite the gear wheel 200 an intermittent gear 232 forming, together with a correspondingly shaped spur 234, a Geneva movement. The spur 234 is secured to the end of a shaft 236 rotating in the sewing frame, and a worm gear 238 (Fig. 12) also secured to the shaft meshes with a worm wheel 240 fixed to a shaft 242. The shaft 242 is mounted at right angles to the shaft 236 in the flange portion 116 of the frame and, at its outer end, has secured thereto a sprocket 244 for driving a sprocket 246 by means of a chain 248. The sprocket 246 is fixed to the outer end of the shaft 166 on which the truck wheel 162 is mounted and the shaft 166 also carries a pinion 250 for rotating the shaft 164 on which gear 228 is secured. The pinion 250 acts through a series of idler gears 252 and 254, and a gear 256 fixed to the outer end of shaft 164. Gears 252 and 254 are mounted for rotation on stud shafts 258 carried by the sewing frame. The train of gears thus described causes the rolls 158 and 162 to be rotated in opposite directions to assist in moving the sewing frame evenly along the support 118.

Means is provided within the last 6 for looping the needle during each work penetrating stroke as follows. Within an opening in the bottom of the last 6 a separate sole plate 259 is located (see Figs. 4, 13 and 15) somewhat smaller than the bottom of the last to provide a slot 260 between the last and plate 259. Within the slot between the last and plate a looper is arranged to slide along a T-shaped groove 262 in the last so that it may follow the movements of the sewing frame on the support 118 about the last. The plate 259 is secured to a similarly shaped supporting plate 264 carried by a double armed bracket 266 fixed to the upper end of a hollow support post 268 (Fig. 4), the lower end of which is flanged and made fast to the partition 5. The hollow support post 268 is of sufficient length and so located that the sole plate 259 will lie flush with the edges of the last and also be equally spaced from the sides of the last. The marginal edges of the form plate 99 which guide the transverse movement of the needle bar carrier 178 are shaped to direct the needle in a path corresponding to that of the looper in the slot 260 between needle strokes.

The looper, as best shown in Figures 15 to 20 inclusive, comprises a U-shaped frame member 270 having vertical pins 272 secured therein. At the ends of pins 272 are rotatably mounted rolls 274 of a size to slide freely in the T-shaped looper guiding groove 262. When positioned in the groove, the frame 270 extends horizontally and at its outer ends rotatably supports a horizontal pivot pin 276. To the pivot pin 276 between the arms of the U-shaped frame 270 is secured a looper plate 278 having an upwardly bent pawl member 280 for engagement with a series of ratchet teeth 282 formed at the inner edges of the last 6. The looper plate 278 is yieldingly held in a horizontal position by a leaf spring 284 fixed at its lower end in a downwardly extending projection of the looper frame 270 arranged at its upper free end to engage the crank shaped end of the pin 276.

To move the looper around the last 6, the looper frame 270 is connected by means of a tension spring 286 with a block 288 actuated through connections to the sewing frame. Movement of the looper frame between stitches while the needle is disengaged from the work is prevented by the pawl 280 engaging the ratchet teeth 282, the spring 286 yielding a sufficient amount to correspond to the feeding movement of the sewing frame. When the needle penetrates the work, it engages the looper plate 278 approximately at the dot-dash position indicated in Fig. 18. After passing through the work, the needle strikes the plate 278, rocking it to the position shown in Fig. 19 and disengaging the pawl 280 from the ratchet teeth 282. The looper frame is now free to slide under the tension of spring 286 in the direction of feeding movement of the sewing frame until the rearward arm of the looper frame, which is provided with an upstanding ledge 290 (see Figs. 16 and 17) engages the side of the needle and prevents further movement of the looper.

The thread, indicated at 291, is guided from the supply through a thread guiding eye 292 at the under side of the looper plate to the previously formed stitch in the work. When the needle forces the looper plate downwardly, the thread is moved to the left of the needle, as viewed in Fig. 19 and, as the looper is carried in the direction of feed, the needle passes into a space between the rearward end of the looper plate and the ledge 290 of the frame, permitting the looper plate to be swung again into its horizontal position, as shown in Fig. 20. During this movement of the looper plate, the thread is moved to the right against the needle and into the needle barb. The pawl 280 is also again permitted to engage the ratchet teeth 282 to hold the looper against further movement by the spring 286. In this position of the looper, the looping operation is repeated.

The actuating connections between the block 288 and the sewing frame 114 include the finger 190 on the needle bar carrier, and a block 294 slidably mounted in a continuous groove 296 in the form plate 99. The block 294 comprises one link in a chain 298 sliding within the groove 296 about the form plate and forming a driving connection between the block 294 and a sprocket 300 rotatable in an opening in the form plate. To the sprocket 300 is secured a shaft 302 and, driven by the shaft 302 is a sprocket 304 rotatable in an opening between the sole plate 259 and the support plate 264. Engaged with the sprocket 304 is a chain 306 sliding in a slot 308 formed between the sole plate and the support plate 264, and the chain 306 is connected at its ends with the block 288. To permit the sewing mechanism and form plate to be moved towards and from the shoe, the shaft 302 is squared at its lower end, providing a disconnectible driving engagement with a similarly shaped opening in the sprocket 304.

The insole 95 and the outsole 96 of the shoe are perforated under their heel seat portions to provide openings for the shaft 302 and, when the sewing mechanism and form are swung into operative relation with the last, the shaft 302 readily fits within the opening of sprocket 304. The shaft 302 in this relation acts as a means for properly locating the parts of the shoe and form during assembly. To assist further in positioning the form on the last in the proper relation, the vertical shaft 108 which supports the sewing mechanism and form carries a block 310 (Figs. 2 and 27) having downwardly extending tongues adapted to enter a slot 312 in the upper surface of bearing 110. The block 310 is so located that when the tongues thereon coincide with the slot 312, the shaft 302 will be in position to enter the opening in the sprocket 304. Before applying the outsole to a shoe, the outsole cut to the proper size and properly grooved is slipped within the track 118 beneath form 99 where it is held by springs 313 fastened inside the support at suitably spaced points so as to be brought into proper registry with the shoe bottom when the sewing mechanism is swung into operating position.

To fasten the insole and upper of a shoe temporarily after the lasting units have operated, the series of sticker points are provided to operate from within the last, as indicated at 314 (Figs. 15 and 22). The sticker points are secured to a sticker point operating plate 316 and pass through aligned openings in the sole plate 259 and support plate 264. The sticker points are of a diameter to fit the holes in the sole and support plates, and their upper ends are reduced in diameter and sharpened to facilitate penetration of the shoe parts. Vertical movement of the sticker point operating plate 316 causes the sticker points to be reciprocated into and from the insole and upper. The sticker points are so located and are of such length that they will pass through the insole and upper just inside the seam line when the plate 316 is raised against the supporting plate 264. When the outsole is pressed down against the upper edges, by the form plate 99, the points will pierce the lower surface of the outsole, but will not pass through the outer or tread surface thereof.

To reciprocate the sticker points, the sticker point supporting plate 316 is connected to the upper end of a rod 318 (Figs. 4, 25 and 26) passing through the hollow post 268 and having a connection at its lower end with block 320. Secured in a perforation in the block is a pin 322 one end of which enters an opening in the intermediate portion of a sticker lowering foot operated lever 324 fulcrumed at its rearward end on a box-like support 326 depending from the intermediate partition 5 of the base. The other end of pin 322 enters an opening in the rearward end of a sticker raising foot operated lever 327 fulcrumed between its ends on the forward part of the support 326. The lower end of rod 318 is surrounded by a coil spring 328 compressed between the support 326 and a collar 329 on the rod. The spring 328 normally acts to raise the sticker points against the insole. To hold the sticker points lowered within the last during lasting, the rod carries a block 330 just above collar 329 in a position to be engaged by a spring pressed bolt 332 sliding in the support 326. The inner end of the bolt is beveled to permit the rod 318 to force it forwardly against a compression spring 334 in lowering the stickers. To withdraw the bolt 332 from the block 330 the outer end of the bolt is headed and enters between the forked ends of a manually operated lever 336 pivoted at 338 on the machine base. After the sticker points are raised by spring 328 they are forced through the insole and upper by pressing down the outer end of foot lever 327. To lower the sticker points, the foot lever 324 is depressed until the sliding bolt 332 latches over the block 330.

The thread supply device is substantially the same as that illustrated and described in the U. S. Patent No. 1,923,563 of August 22, 1933 and comprises a wax pot 340 (see Fig. 4) a thread tension 342 on the wax pot, and a supply reel 344 mounted on an arm 346 extending from the wax pot frame. To support the thread supply device, the arm 346 is mounted on a sleeve 348 rotating loosely about the hollow support post 268 on which the sole plate of the last is fixed. The thread 291 leads directly from the wax pot to the thread eye 292 in the looper plate 278.

In order to prevent the thread from being wound about the support post, thus interfering with the uniformity in tension on the thread as the looper is moved about the last, the sleeve 348 is rotated with the looper and sewing frame. To accomplish this, the upper end of the sleeve 348 carries a sprocket 380 surrounded by a chain 352 driven by a second sprocket 254 at the lower end of a shaft 256, the upper end of which is joined to the sprocket 304 which operates the looper chain 306. The ratio of teeth in sprockets 350 and 354 is such that the thread supply device will be rotated about support post 268 once for each complete circuit of the looper and sewing frame about the last.

After the sewing operations are finished, the heel of the shoe may be attached, the edges trimmed and other finishing operations performed while the shoe remains supported on the last. Upon removing the shoe, the stitches passing through all of the shoe parts will provide ample strength to hold the shoe against distortion as a result of the force required in removing it from the last.

Certain features of the invention relating to a method of shoe making and to the machine including the lasting devices by means of which the method is performed, as herein disclosed, form the subject-matter of a divisional application Serial No. 179,681 filed December 14, 1937.

Having thus explained the nature and object of the invention, and having specifically described a machine embodying the invention in its preferred form, what is claimed is:

1. A machine for use in the manufacture of shoes having, in combination, a hollow last, a form cooperating with the last to clamp an outsole on the lasted upper of a shoe, and a thread sewing mechanism associated with the last to secure the outsole and upper permanently together with stitches passing through the parts and appearing at the outer surface of the outsole and inside of the shoe.

2. A machine for use in the manufacture of shoes having, in combination, a hollow last, a form cooperating with the last to clamp an outsole on the insole and lasted upper of a shoe and a thread sewing mechanism associated with the last to secure the outsole, upper and insole permanently together with stitches passing through the shoe parts and appearing at the outer surface of the outsole and the inner surface of the insole, said last and sewing mechanism being relatively movable to transfer the point of operation of the sewing mechanism about the shoe, and to disengage the sewing mechanism from the shoe when the sewing is completed.

3. A machine for use in the manufacture of shoes having, in combination, a last to support the lasted upper and insole of a shoe, a sewing frame, sewing mechanism in the frame, a support upon which the sewing frame moves about the shoe as the sewing mechanism operates to sew a seam attaching an outsole to the shoe, and tracks on the support to guide the sewing frame and maintain the sewing mechanism in proper position with relation to the shoe during the formation of the seam.

4. A machine for use in the manufacture of shoes having, in combination, a last to support the lasted upper and insole of a shoe, a sewing frame, sewing mechanism in the frame, a support upon which the sewing frame moves about the shoe as the sewing mechanism operates to sew a seam attaching an outsole to the shoe, tracks on the support to guide the sewing frame and maintain the sewing mechanism in proper position with relation to the shoe during formation of the seam and an arm on which the support is mounted to carry the weight of the support and sewing frame and hold it either in operative position with relation to the last or disengaged from the last when the sewed shoe is being removed from the last.

5. A machine for use in the manufacture of shoes having, in combination, a sewing frame, stitch forming devices in the frame including a straight work piercing needle and a needle actuating bar, means for causing a relative feeding movement of the sewing frame and a shoe being operated upon, a carrier for the needle bar mounted in the sewing frame for movement transverse to the direction of feed, and a form fixed with relation to the shoe during sewing for guiding the transverse movement of the needle bar carrier to cause the seam to lie along a predetermined path.

6. A machine for use in the manufacture of shoes having, in combination, a last for supporting a shoe, a form fixed with relation to the last during sewing, a sewing frame, stitch forming devices in the frame comprising a straight work piercing needle and a needle actuating bar, means for causing a relative feeding movement of the sewing frame and shoe, a carrier for the needle bar mounted in the sewing frame for movement transverse to the direction of feed, and means connected with the carrier engaging the form to cause the seam to correspond in shape with the form.

7. A machine for use in the manufacture of shoes having, in combination, a thread sewing mechanism associated with the last to secure the outsole, upper and insole of a shoe on the last together with stitches passing through the parts and appearing on the outer surface of the outsole and the inner surface of the insole, said last and sewing mechanism being relatively movable to transfer the point of operation of the sewing mechanism about the shoe, and a form cooperating with the last to clamp the outsole on the insole and upper and to guide the point of operation of the sewing mechanism as the seam progresses about the shoe.

8. A machine for use in the manufacture of shoes having, in combination, a hollow last, a form cooperating with the last to clamp an outsole to the lasted upper of a shoe, a thread sewing mechanism associated with the last to secure the outsole and upper together with stitches passing through the parts and appearing on the outer surface of the outsole and the inside of the shoe, and temporary fastening means in the last for holding the upper while the outsole is being secured to the upper and insole.

9. A machine for use in the manufacture of shoes having, in combination, a hollow last, a form cooperating with the last to clamp an outsole to the insole and lasted upper of a shoe, a thread sewing mechanism associated with the last to secure the outsole, upper and insole together with stitches passing through the parts and appearing on the outer surface of the outsole and the inner surface of the insole, temporary fastening means in the last for holding the insole and upper together while the outsole is being secured to the upper and insole, and a member operable to draw the fastening means from the upper and insole when the sewing is completed.

10. A machine for use in the manufacture of shoes having, in combination, a hollow last, a thread sewing mechanism associated with the last to secure together the outsole, upper and insole of a shoe on the last with stitches passing through the parts and appearing on the outer surface of the outsole and the inner surface of the insole, said last and sewing mechanism being relatively movable to transfer the point of operation of the sewing mechanism about the shoe, sticker points within the last, and a member for actuating the sticker points simultaneously to cause their ends to project through the bottom of the last, the insole, and the upper to a position where they will enter the inner surface of the outsole without passing through the outer surface thereof.

11. A machine for use in the manufacture of shoes having, in combination, a hollow last, a thread sewing mechanism associated with the last to secure the outsole, upper and insole of a shoe on the last together with stitches passing through the parts and appearing on the outer surface of the outsole and the inner surface of the insole, said last and sewing mechanism being relatively movable to transfer the point of operation of the sewing mechanism about the shoe, sticker points within the last, a member for actuating the sticker points to cause their ends to project through the bottom of the last, the insole and the upper to a position where they will enter the inner surface of the outsole without passing through the outer surface thereof and a form cooperating with the last to hold the outsole against the sticker points in proper relation to the insole and upper during sewing.

12. A machine for use in the manufacture of shoes having, in combination, a last for supporting a shoe upper and outsole, a form shaped to conform with the bottom surface of the last, a support surrounding the form while leaving a clearance space between the support and the form, and stitch forming devices mounted to move on the support around the form including a straight reciprocating needle arranged to penetrate the shoe parts supported on the last through said clearance space.

13. A machine for use in the manufacture of shoes having, in combination, a last for supporting a shoe upper and outsole, a form shaped to conform with the bottom surface of the last, a support surrounding the form while leaving a clearance space between the support and the form, a sewing frame mounted on the support and guided thereby to move around the form, stitch forming devices mounted in the frame including a straight reciprocating needle, a needle bar and a needle bar carrier mounted for movement transversely of the movement of the sewing frame, and means connected with the carrier engaging the edge of the form to cause the seam to correspond in shape with the form.

14. A machine for use in the manufacture of shoes having, in combination, a last for supporting a shoe upper and outsole, a form shaped to conform with the bottom surface of the last, a support surrounding the form while leaving a clearance space between the support and the form, a sewing frame mounted on the support and guided thereby to move around the form, stitch forming devices mounted in the frame including a straight reciprocating needle, and mechanism in the sewing frame for reciprocating the needle and for imparting feeding movements to the sewing frame along the support.

15. A machine for use in the manufacture of shoes having, in combination, a last for supporting a shoe, a sewing frame, stitch forming devices in the frame comprising a straight hook needle mounted to penetrate the sole of the shoe, a support on which the sewing frame has a feeding movement relatively to the last, a guideway within the last extending about the margin of the last bottom, a looper sliding in the guideway, and a form outside the shoe for guiding the needle during the feeding movement of the sewing frame in a path corresponding in shape to the looper guideway in the last to cause the needle as it penetrates the shoe to cooperate properly with the looper.

16. A machine for use in the manufacture of shoes having, in combination, a last for supporting a shoe, a sewing frame, stitch forming devices in the frame comprising a straight hook needle mounted to penetrate the sole of the shoe, a support on which the sewing frame has a feeding movement relatively to the last, a guideway within the last extending about the margin of the last bottom, a looper sliding in the guideway, means for imparting feeding movement to the sewing frame along the support, and connections between the sewing frame and looper to move the looper with the needle as the seam progresses about the shoe.

17. A machine for use in the manufacture of shoes having, in combination, a last for supporting a shoe, a sewing frame, stitch forming devices in the frame comprising a straight hook needle mounted to penetrate the sole of the shoe, a support on which the sewing frame has a feeding movement relatively to the last, a guideway within the last extending about the margin of the last bottom, a looper sliding in the guideway, means for imparting feeding movement to the sewing frame along the support, connections between the sewing frame and looper to move the looper with the needle as the stitching point is transferred about the shoe, and means controlled by the needle for keeping the looper in proper position to cooperate with the needle during the formation of each stitch.

18. A machine for use in the manufacture of shoes having, in combination, a hollow last for supporting a lasted shoe upper and insole, a form cooperating with the last to hold an outsole in proper position for attachment to the upper and insole, sewing mechanism including a straight hook needle for penetrating the shoe parts on the last and a looper within the last cooperating with the needle to form stitches passing through the parts of the shoe and appearing at the outer surface of the outsole and inner surface of the insole, a supporting frame for the needle movable relatively to the last to transfer the stitching point about the shoe, connections between the needle supporting frame and looper to move the looper with the needle as the stitching point is transferred and a member on the needle supporting frame guided by the form to cause the seam to correspond in shape to the form.

19. A machine for use in the manufacture of shoes having, in combination, a last for supporting a shoe, a sewing frame, stitch forming devices in the frame comprising a straight hook needle mounted to penetrate the sole of the shoe, a support on which the sewing frame has a feeding movement relatively to the last, a guideway within the last extending about the margin of the last bottom, a looper sliding in the guideway, a shaft passing through the outsole of the shoe, and connections between one end of the shaft and the needle supporting frame and between the other end of the shaft and the looper to cause the looper to be moved with the needle as the stitching point is transferred about the shoe.

20. A machine for use in the manufacture of shoes having, in combination, a last for supporting a shoe, a sewing frame, stitch forming devices in the frame comprising a straight hook needle mounted to penetrate the sole of the shoe, a support on which the sewing frame has a feeding movement relatively to the last, a guideway within the last extending about the margin of the last bottom, a looper sliding in the guideway, a shaft passing through the outsole of the shoe, a flexible connection between the shaft and the needle supporting frame and a similar connection between the shaft and looper to cause the looper to be moved with the needle as the stitching point is transferred about the shoe.

21. A machine for use in the manufacture of shoes having, in combination, a last for supporting a shoe, a sewing frame, stitch forming devices in the frame comprising a straight hook needle mounted to penetrate the sole of the shoe, a support on which the sewing frame has a feeding movement relatively to the last, a guideway within the last extending about the margin of the last bottom, a looper sliding in the guideway, a form engaging the outer surface of the outsole of the shoe, a removable shaft passing through the outsole between the form and last, a flexible connection slidably mounted in the form for driving the shaft, a member on the needle supporting frame for driving said flexible connection, and a flexible connection in the last between said shaft and looper for moving the looper with the needle as the seam progresses about the shoe.

22. A machine for use in the manufacture of shoes, having, in combination, a hollow last for supporting a lasted shoe upper and an outsole, sewing mechanism including a straight hook needle outside the shoe for penetrating the shoe parts on the last and a looper within the last cooperating with the needle to form stitches passing through the parts of the shoe and appearing at the outer surface of the outsole and the inside of the shoe, a supporting frame for the needle movable relatively to the last to transfer the stitching point about the shoe, connections between the needle supporting frame and looper to move the looper with the needle as the stitching point is transferred about the shoe, a thread supply device for furnishing thread to the looper, and means for moving the thread supply device about the last as the stitching point is transferred about the shoe.

23. A machine for use in the manufacture of shoes having, in combination, a hollow last having a separate spaced sole plate for supporting the bottom of a lasted shoe upper and an outsole, a post inside the last to support the sole plate in proper relation to the bottom margin of the last, sewing mechanism including a straight hook needle arranged to pass through the shoe parts and into the space between the bottom margin of the last and the sole plate and a looper within said space cooperating with the needle to form stitches passing through the parts of the shoe and appearing at the outer surface of the outsole and the inside of the shoe, means for feeding the sewing mechanism about the last, a thread tension device carried by the post, and means for moving the tension device about the post in proper timed relation with the feeding movement of the sewing mechanism.

ANTHONY LABRIE.